(12) United States Patent
Patzak et al.

(10) Patent No.: US 10,170,951 B2
(45) Date of Patent: Jan. 1, 2019

(54) ELECTRICAL MACHINE

(71) Applicants: FEAAM GmbH, Neubiberg (DE); Universitaet der Bundeswehr Munich, Neubiberg (DE)

(72) Inventors: Adrian Patzak, Munich (DE); Florian Bachheibl, Munich (DE); Gurakuq Dajaku, Neubiberg (DE); Dieter Gerling, Holzkirchen (DE)

(73) Assignee: VOLABO GMBH, Holzkirchen (DE)

( * ) Notice: Subject to any disclaimer, the term of this patent is extended or adjusted under 35 U.S.C. 154(b) by 535 days.

(21) Appl. No.: 14/859,180

(22) Filed: Sep. 18, 2015

(65) Prior Publication Data

US 2016/0087497 A1    Mar. 24, 2016

(30) Foreign Application Priority Data

Sep. 18, 2014   (DE) .......................... 10 2014 113 489

(51) Int. Cl.
| | |
|---|---|
| *H02K 11/33* | (2016.01) |
| *H02K 3/12* | (2006.01) |
| *H02K 9/00* | (2006.01) |
| *H02K 11/00* | (2016.01) |
| *H02K 5/22* | (2006.01) |

(52) U.S. Cl.
CPC .............. *H02K 3/12* (2013.01); *H02K 9/005* (2013.01); *H02K 11/001* (2013.01); *H02K 11/0073* (2013.01); *H02K 11/33* (2016.01); *H02K 5/225* (2013.01); *H02K 2213/12* (2013.01)

(58) Field of Classification Search
CPC ..................................... H02K 11/33

USPC ..................... 310/270, 68 D, 88 R; 361/271
See application file for complete search history.

(56) References Cited

U.S. PATENT DOCUMENTS

| 5,491,370 | A | 2/1996 | Schneider et al. | |
|---|---|---|---|---|
| 9,502,937 | B2 * | 11/2016 | Hamajima | ............... H02K 3/28 |
| 2005/0040716 | A1 * | 2/2005 | Schmid | ............... H02K 3/12 |
| | | | | 310/71 |
| 2005/0189828 | A1 | 9/2005 | Nakayama et al. | |
| 2006/0002054 | A1 | 1/2006 | Anwar et al. | |

(Continued)

FOREIGN PATENT DOCUMENTS

| CN | 1672308 A | 9/2005 |
|---|---|---|
| DE | 102005032965 A1 | 3/2007 |
| EP | 1401089 A1 | 3/2004 |

OTHER PUBLICATIONS

Wan, Ying, "New Crash Course to an Electrician", Fujian Science & Technology Publishing House, Dec. 2006.

*Primary Examiner* — Terrance Kenerly
(74) *Attorney, Agent, or Firm* — Morgan, Lewis & Bockius LLP (57) ABSTRACT

The present invention relates to an electrical machine having a stator. The stator comprises a plurality of slots for receiving a stator winding. One respective conductor section of the stator winding is inserted into each slot. The conductor sections of at least one pair of poles are short-circuited to one another on a first side of the stator. The conductor sections on a second side of the stator, opposite from the first side, are each connected to a terminal of a power supply unit. The power supply unit consists of two annular electrical conductors, between which at least one power-electronics component is arranged.

16 Claims, 14 Drawing Sheets

(56) References Cited

U.S. PATENT DOCUMENTS

2014/0132101 A1* 5/2014 Tomita .................. H02K 3/522
   310/146

* cited by examiner

ELECTRICAL MACHINE

CROSS REFERENCE TO RELATED APPLICATION

This patent application claims the priority of German patent application 10 2014 113 489.3, the disclosure content of which is hereby incorporated by reference.

SUMMARY

The present invention relates to an electrical machine having a stator.

A rotor can be movably mounted in relation to the stator.

Electrical machines can be operated in motor mode or generator mode.

The stator has windings that can be connected to an electrical system, which is frequently multiphase.

Distributed windings are generally used for applications with more than two phases.

The main advantage of distributed windings is that the magnetomotor force in the air gap between stator and rotor has a lower content of higher harmonics, i.e a smaller content of undesired harmonics of the magnetomotor force. This results in a high performance of the machine, with low rotor loss, low noise and few vibration problems.

A disadvantage of distributed winding is the elaborate production.

There is therefore a need for an electrical machine that has the good electrical properties of a divided winding along with the advantage of a low production expense.

This problem is solved by the subject matter of Claim 1. Advantageous configurations and improvements are specified in the subordinate claims.

In one embodiment, a machine having a stator is provided. The stator comprises a plurality of slots that are formed between adjacent teeth of the stator. The slots are used for accommodating a stator winding. One respective conductor section of the stator winding is placed in each slot. The conductor sections of at least one pair of poles are short-circuited to one another on a first side of the stator. On a second side of the stator, opposite from the first side, the free ends of the conductor sections are connected to a terminal of a power supply unit. The power supply unit consists of two annular electrical conductors, between which at least one power-electronics component is arranged.

The power-electronics component is associated with one or more conductor sections.

According to the proposed principle, the stator-side distributed windings mentioned above are replaced by a concentrated winding, which is further simplified in the sense that it has one conductor section per slot and therefore the conductor sections can be designed to run substantially in a straight line in the axial direction.

For example, high currents with a low voltage can be used, in order to achieve a magnetomotor force like that for conventional machines with a distributed winding.

The integration of the power electronics between the two annular conductors implies a particularly compact structure of the machine. These annular conductors, exactly like the opposing short-circuiting means, which can be designed as a short circuit ring, and the conductor sections—and therefore the entire machine—can be produced with a particularly low expense.

In one embodiment, a respective power-electronics component contacts each conductor section. Thus a respective power-electronics component is used for supplying each conductor section.

A plurality of power-electronics components distributed along the circumference of the stator, each arranged between the annular conductors, can advantageously be provided.

A power-electronics component preferably comprises at least one semiconductor switch, a driver circuit for the semiconductor switch and at least one capacitor.

It is understood that the power-electronics part of the power supply unit can be integrated completely between the annular conductor sections of the stator winding in order to supply power to the conductor section.

Thus the structure of the machine is not only related to particularly low production expense but is also very compact.

In one embodiment, the power-electronics component has two semiconductor switches, each of which is connected to a respective one of the annular conductors.

This connection is preferably made over a large surface area in order to take into account the high currents to be expected.

For example, the semiconductor switches can be connected to the annular conductors over a large area in the radial direction.

In an alternative embodiment, the semiconductor switches are connected to the annular conductors in the axial direction.

The power-electronics component can be arranged completely inside the annular conductors, as viewed in an annular projection.

Alternatively, parts of the power-electronics component can protrude from the radial projection of the annular conductors. For example, the at least one capacitor can extend axially over and past the annular conductor.

One of the two annular conductors can realize a positive electrical DC voltage supply. Another of the two annular conductors can guarantee a negative electrical DC voltage supply. This can be understood as a DC bus.

The semiconductor circuits can advantageously be connected to form a half-bridge.

The at least one capacitor can be designed as a DC link capacitor. A series and/or parallel connection of a plurality of capacitors with an intervening support matrix constructed of conductive and nonconductive elements can also be provided.

An active cooling system can be provided in order to dissipate the waste heat from the semiconductor switches and the additional components of the power-electronics components. For example, an annular cooling channel, which is arranged in at least one of the two annular conductors or between the two annular conductors, can be provided in order to conduct a fluid.

Thus, the lost heat can be dissipated directly where it arises.

The power supply unit can be designed to supply each conductor section with a respective electrical phase of its own by means of the respective power-electronics component.

The proposed design has particular advantages in consideration of electromagnetic compatibility, because no alternating current lines prone to higher harmonics need be arranged. Moreover, a separate converter housing is not necessary. No cables between a separate power electronics unit and the actual machine are necessary, because the power electronics are positioned at the point where the winding head is situated in conventional machines.

The number of phases can be three, four, five, or at least 10.

To achieve a particularly lower production expense, the conductor sections can be formed straight. The conductor sections can be aluminum rods, copper rods, bronze rods or alloys.

Further details and configurations will be described in detail below for several embodiments with reference to figures.

BRIEF DESCRIPTION OF THE DRAWINGS

Therein.

DETAILED DESCRIPTION

Figure 1:
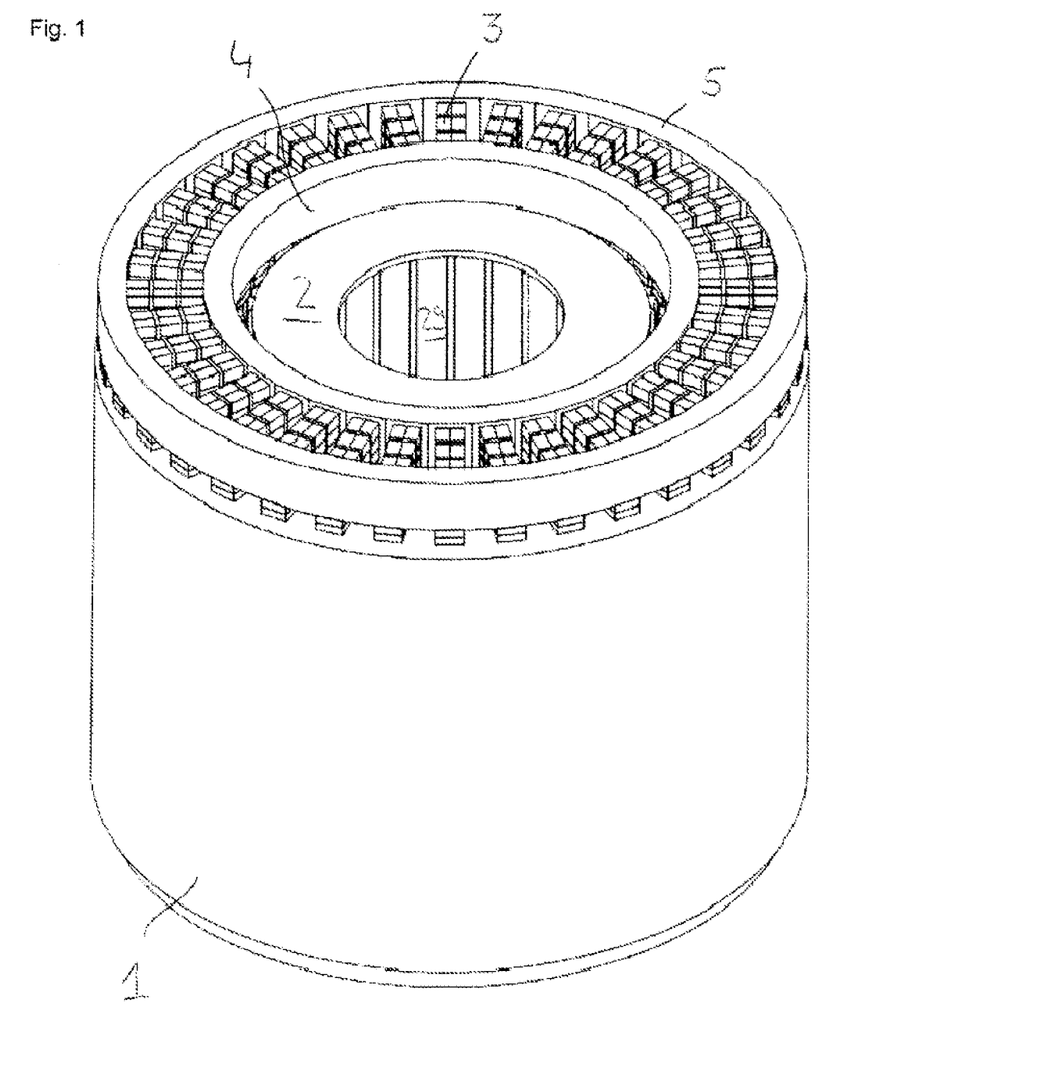
FIG. 1 shows an embodiment of a machine according to the proposed principle.

FIG. 1 shows an exemplary embodiment of an electrical machine according to the proposed principle. The machine comprises a stator 1. Along the periphery, the stator 1 has distributed slots 36 that extend in straight lines in the axial direction. A conductor section 13 is introduced into each slot 36. The reader is referred in this regard to the representation of FIG. 24.

The conductor sections of at least one pole pair are short-circuited in a short-circuit ring on the underside, not visible in FIG. 1. A power-electronics component 3, which is arranged between an inner annular conductor 4 and an outer annular conductor 5, is associated with each conductor section 13. A control board 2 is located inside the inner conductor 4. The control board has an opening 29 in the center for passage of the rotor shaft.

Each power-electronics component 3 is constructed as a module, and comprises a half-bridge as described in detail below.

Figure 2:
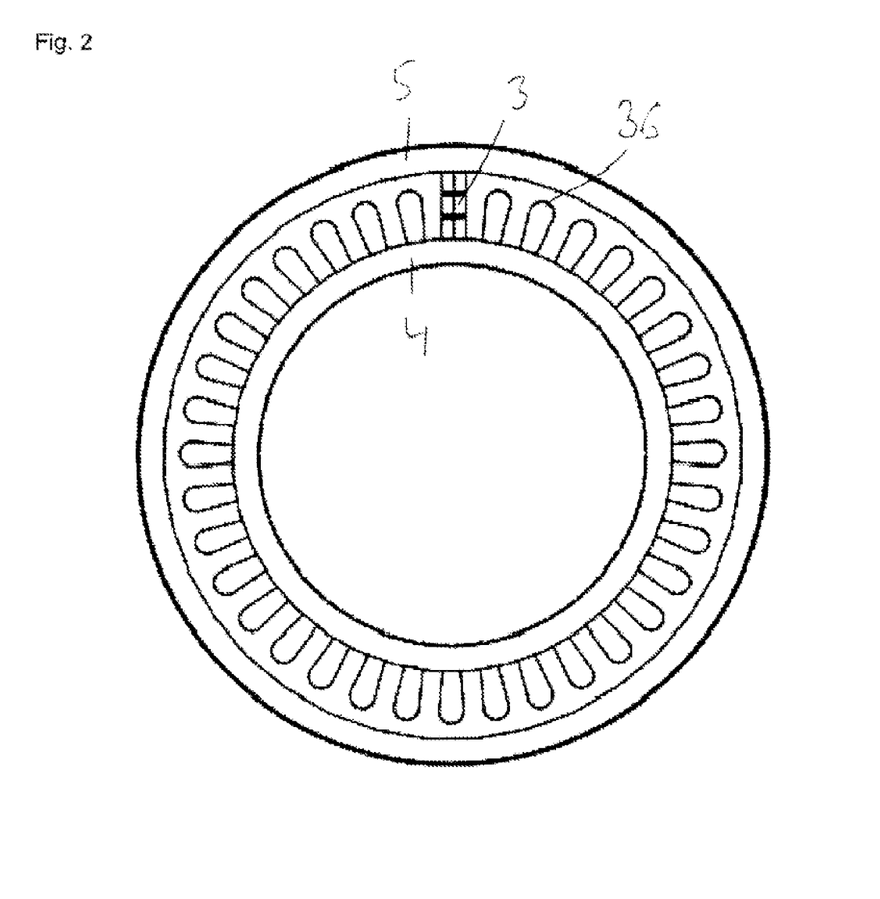
FIG. 2 shows the example from FIG. 1 in a cross section, wherein only one power-electronics component is shown.

FIG. 2 shows an axial view onto the second side of the embodiment from FIG. 1. For the sake of example, only one power-electronics component 3 is drawn, which is in turn arranged between the inner annular conductor 4 and the outer annular conductor 5. Also visible are the slots 36 of the stator, which are distributed along the periphery of the stator and in each of which the conductor sections, not shown here, are arranged.

Figure 3:
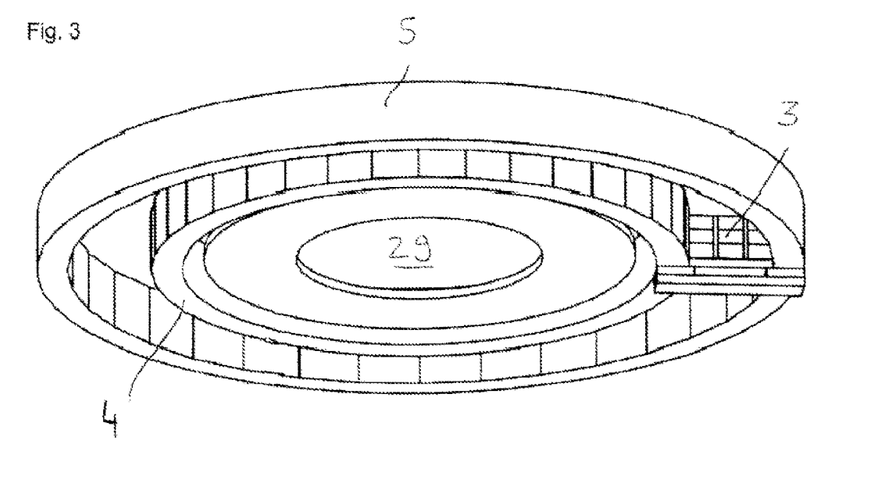
FIG. 3 shows an embodiment of a power-electronics component between two annular conductors according to the proposed principle.

FIG. 3 shows a simplified cutout of the embodiment according to FIG. 1. The stator 1 having the slots and the conductor sections 13 is not drawn in FIG. 3. In addition, only one of the numerous power-electronics components 3 distributed along the circumference is drawn, for the sake of clarity. The two annular conductors 4, 5 each have a rectangular cross section. Both lie in a common plane perpendicular to the axis of rotational symmetry of the stator, which is simultaneously the axis of rotation of the rotor. It can be seen that the power-electronics component 3 is arranged largely within the two annular conductors 4, 5, as viewed in a radial projection. An opening 29 for receiving a rotor shaft is provided centrally.

Figure 4:
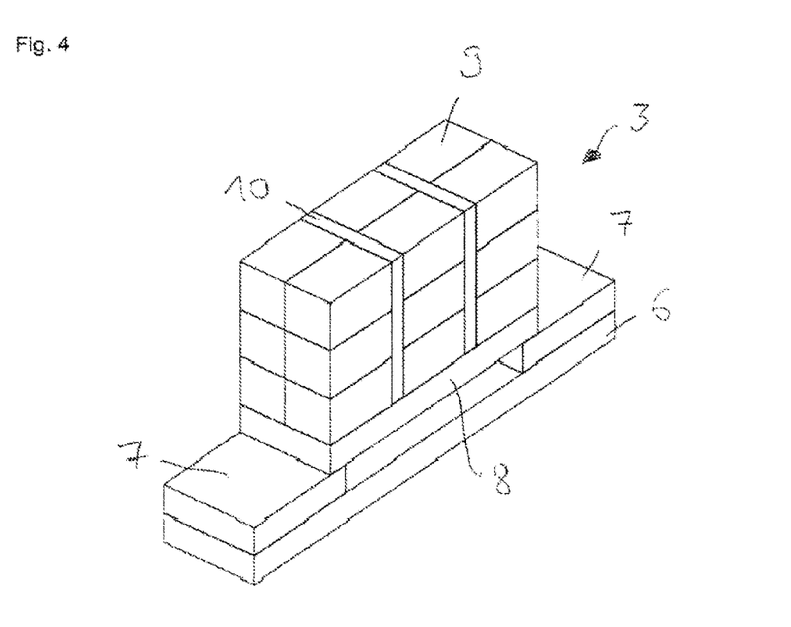
FIG. 4 shows the power-electronics component from the example of FIG. 3.

FIG. 4 shows the power-electronics component 3 of FIGS. 1, 2 and 3 in an enlargement. The power-electronics component 3 comprises a cuboid baseplate 6. Its main direction extends in a radial direction. At each end of the baseplate 6, a respective semiconductor switch 7 is arranged in such a manner that one of the semiconductor switches 7 contacts the inner annular conductor 4 over a large surface, and the other semiconductor switch 7 contacts the outer annular conductor 5 over a large surface. The semiconductor switches themselves have a substantially quadratic basic shape. Further above the semiconductor switches 7 and in addition inside the two angular-shaped conductors, a driver circuit 8 that is electrically connected to the two semiconductor switches 7 is provided. Above the driver circuit 8, numerous capacitors 9 are arranged, which are retained by a support matrix 10. The support matrix 10 comprises conductive and nonconductive parts.

The base plate 6 is connected at the underside thereof over a large area to the end face of the associated conductor section 13 of the stator winding.

The semiconductor switches 7 can be MOSFETs or IGBTs, for example.

The two annular conductors 4, 5 realize a positive and a negative polarity of a DC bus.

The semiconductor switches 7 can be connected to the annular conductors 4, 5 by, for example, welding, soldering or pressure, which can be built up by a spring or a clip.

The two annular conductors 4, 5 can be constructed to be round or n-polygons as indicated in FIG. 3.

The capacitors 9 are connected to the annular conductors 4, 5 by welding, soldering, or a resilient contact. The support matrix 10 comprises conductor tracks for a combined parallel and serial connection of the capacitors 9. These conductor tracks can comprise copper or aluminum, for example. A plastic sheath, which holds the entire structure together, is also provided.

The electrical switching construction will be explained later.

Figure 5:
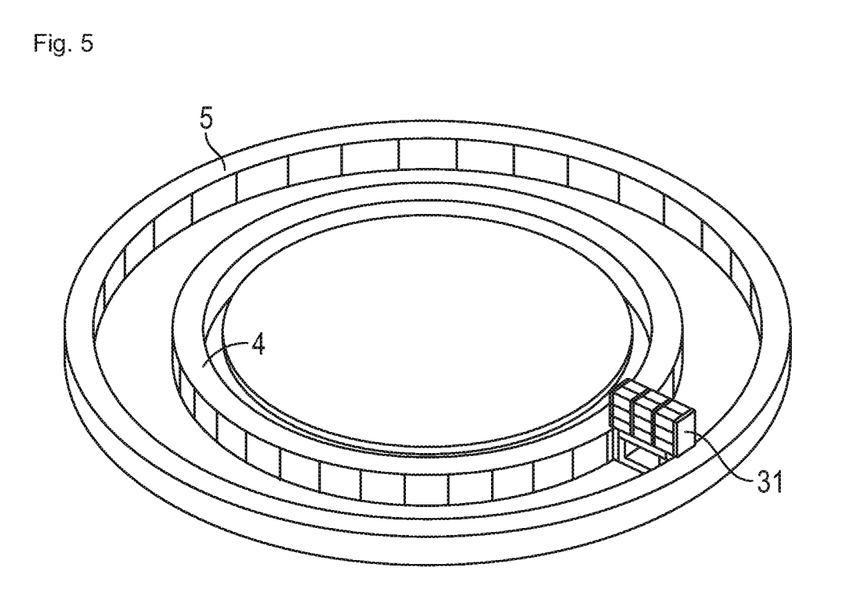
FIG. 5 shows a second embodiment of a power-electronics component between two annular conductors according to the proposed principle.
Figure 6:
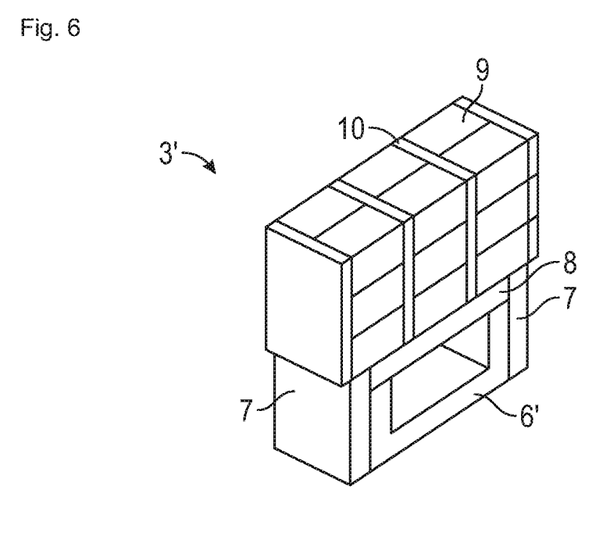
FIG. 6 shows the power-electronics component from FIG. 5.

FIGS. 5 and 6 show an additional embodiment according to the proposed principle.

The power-electronics component 3' of FIGS. 5 and 6 largely coincides in structure and function with that of FIGS. 3 and 4, the difference in FIG. 5 being that the semiconductor switches 7 do not contact the annular conductors 4, 5 axially, but rather in the radial direction.

It is recognizable that the structure of the capacitors 9 and the support matrix 10 in FIG. 6 is unchanged in comparison to FIG. 4.

The driver circuit 8 is shortened in this case, however, in order to create space for the semiconductor switches 7, which extend in this case up to the capacitor bank 9, 10.

The semiconductor switches 7 are in turn contacted over a large area by a baseplate 6', which is not formed as a flat plate in this case, but rather in a U-shape. Thus, the baseplate 6' creates the connection between the conductor section 13 of the stator winding, which is to be mounted on the underside of the baseplate, and the semiconductor switches 7. In this structure, the capacitors 9 protrude from the annular conductors 4, 5 of the DC bus.

Figure 7:
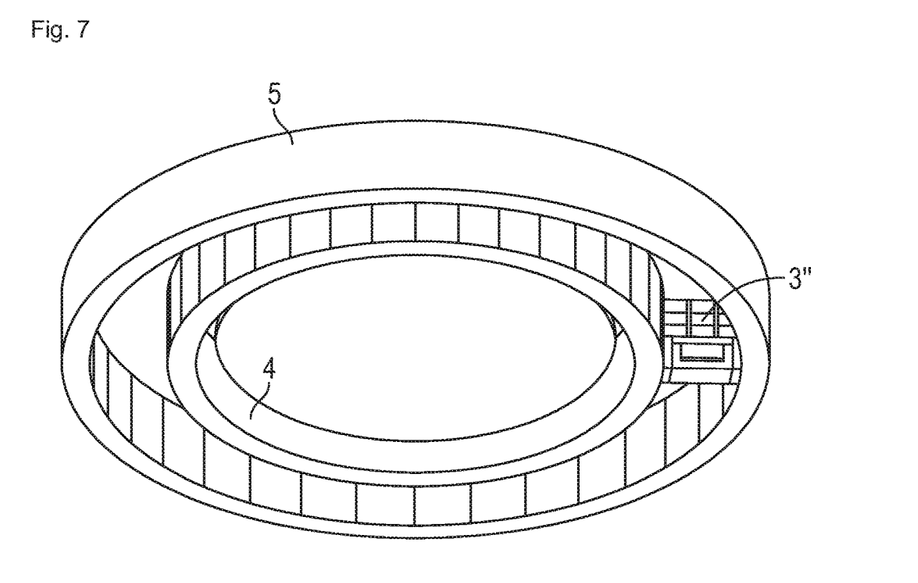
FIG. 7 shows a third embodiment of a power-electronics component according to the proposed principle.
Figure 8:
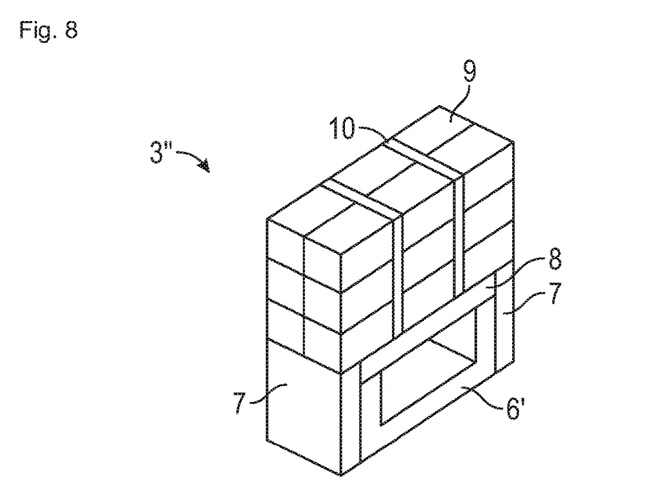
FIG. 8 shows the power-electronics component from FIG. 7.

FIGS. 7 and 8 show a third embodiment according to the proposed principle. This example is largely congruent in structure and operation with the second embodiment according to FIGS. 5 and 6 and to that extent will not be described again.

Unlike FIGS. 5 and 6, however, the capacitors 9 of the power-electronics component 3" according to FIGS. 7 and 8 do not protrude from the annular conductors 4, 5.

In contrast, the annular conductors 4, 5 have a markedly larger extent in the axial direction than those in the embodiment of FIGS. 5 and 6.

Figure 9:
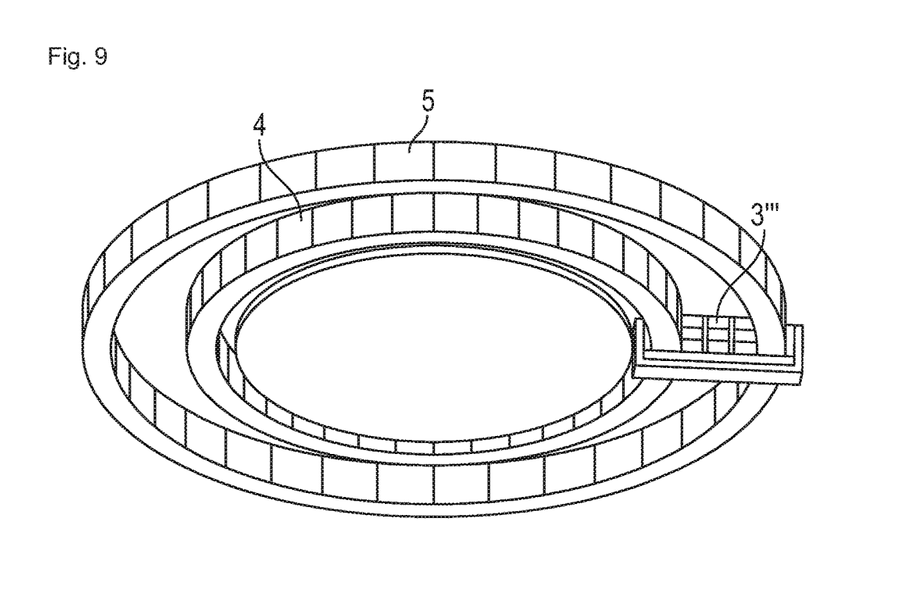
FIG. 9 shows a fourth embodiment of a power-electronics component according to the proposed principle.
Figure 10:
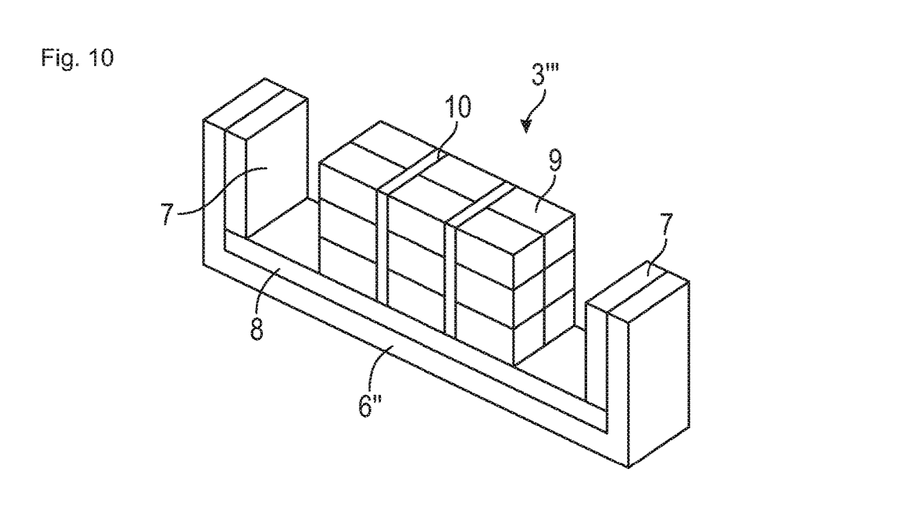
FIG. 10 shows the power-electronics component from FIG. 9.

FIGS. 9 and 10 show a fourth embodiment of the power-electronics component 3'''. The capacitor bank having the capacitors 9 and the support matrix 10 is designed as in FIG. 8. The baseplate 6" is again U-shaped, but reaches around the annular conductors 4, 5 from the outside. Thus the semiconductor switches 7 are not aligned parallel to one another inside the annular conductors, but are instead arranged outside the annular conductors 4, 5 and are again aligned in parallel. Outside means that one of the semiconductor switches 7 is arranged inside the inner annular conductor 4 and the other semiconductor switch 7 is arranged outside the outer annular conductor 5. The drive circuit 8 is lengthened accordingly.

Figure 11:
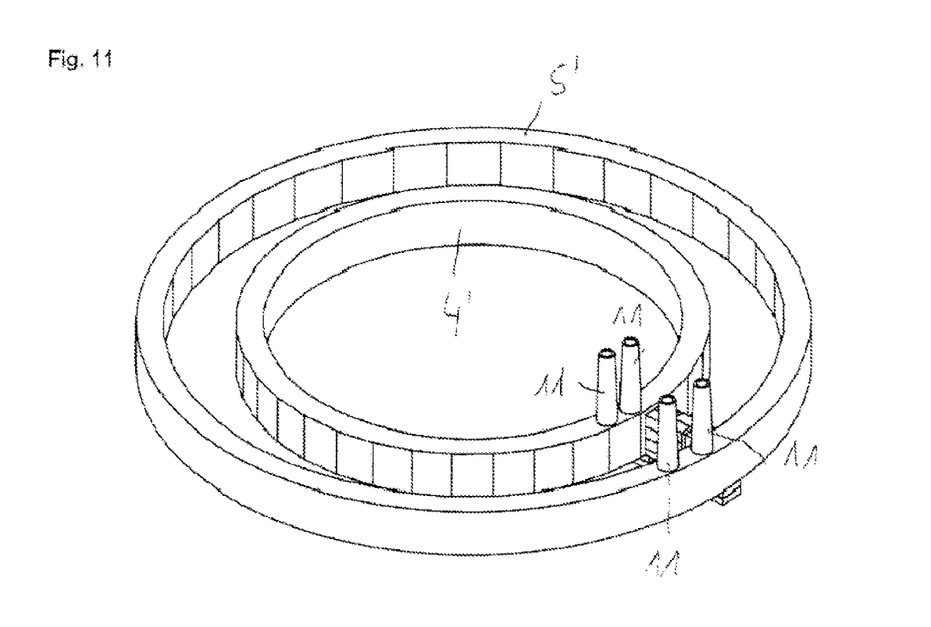
FIG. 11 shows an embodiment according to the proposed principle, having a cooling channel.

FIG. 11 shows an embodiment that constitutes an improvement of the embodiment according to FIGS. 3 and 4. The annular conductors 4', 5' are formed hollow in order to cool the system, so that a cooling medium in the form of a fluid can flow through them. The cooling medium is conducted in and out via flanges 11 on the annular conductors 4', 5'.

The cooling medium need not be deionized in the present embodiment, because the voltages between the two rings 4', 5' are too low to drive significant currents. The coolant can be transported through nonconductive tubes from the flanges 11 to the rings 4', 5' and away from the rings 4', 5'. For each ring 4', 5', one of the flanges 11 can be used as a drain.

Figure 12:
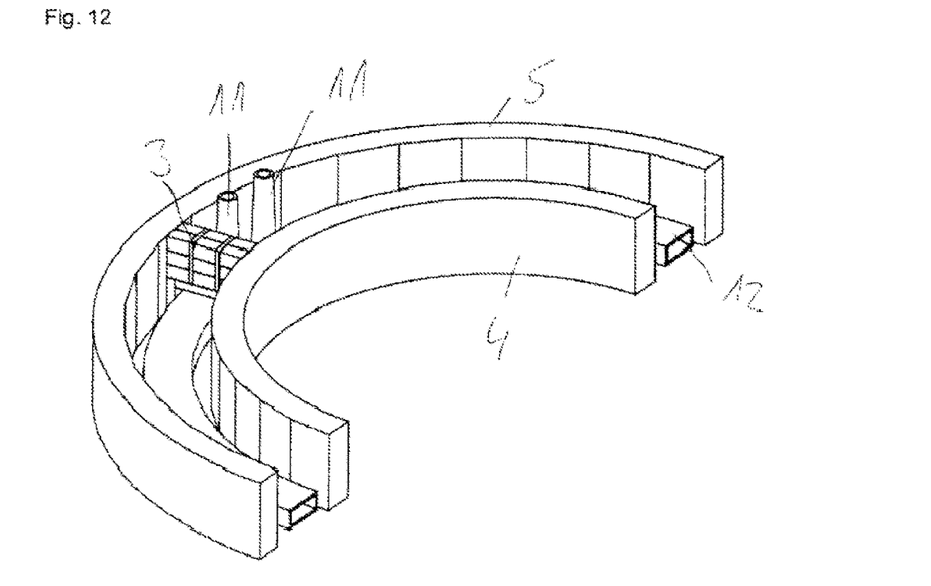
FIG. 12 shows an additional embodiment according to the proposed principle, having a cooling channel.

FIG. 12 shows an alternative embodiment for cooling the power-electronics components 3. In this case a circular cooling channel 12, which extends substantially in the radial direction and has a rectangular cross section, is formed between the two annular conductors 4, 5. Here too the flanges 11 are used for supplying and discharging a coolant.

This embodiment can be based on the embodiment of FIGS. 7 and 8. In this case, the cavity formed by the U-shaped base plate 6' is used to pass the cooling channel. The cooling channel 12 is therefore arranged inside the U-shaped base plate 6'.

In an alternative variant not shown here, the cooling is designed such that the power-electronics components 3 are entirely encapsulated by potting resin for example, and a cooling jacket covers the annular conductors 4, 5 and the power-electronics components 3. The driver circuit 8, the semiconductor switches 7 and other active switching units must each be encapsulated individually such that no coolant can enter. A cooling jacket can be positioned over the entire structure.

For all versions of the cooling, the waste heat is dissipated where it arises, namely in the power-electronics components.

For all the embodiments discussed so far, the baseplate 6 is fastened to the conductor sections 13 of the stator winding by welding, bolting or pressing, for example.

In the two latter mentioned cases, a suitable material can be inserted between the baseplate 6 and the conductor section 13 in order to improve the electrical and thermal conductivity of the junction.

The two annular conductors 4, 5, which form the DC bus, can be electrically connected to an electrical system such as an electrical system for a vehicle can be achieved as follows. If only one connection point is to be used, each ring 4, 5 preferably has an especially large cross section at this point, since the largest current flows there. The cross section can decrease up to the point opposite from the connection point. This can be achieved, for example, by varying the axial height or radial width of the ring 4, 5 in this area.

The actual connection can alternatively be achieved by two concentric crown-like structures, which are connected at as many points as desired to the rings 4, 5. This can include wire bonding.

Figure 13:
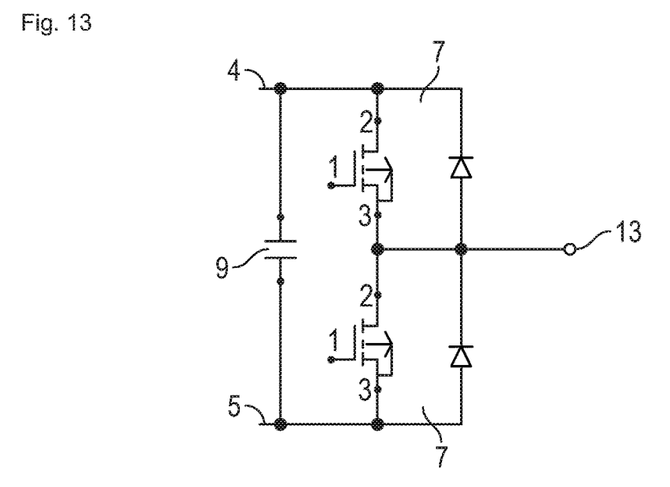
FIG. 13 shows an embodiment of a half-bridge.

FIG. 13 shows an embodiment of the half bridge, which is an electrical equivalent circuit of the power-electronics component 3. It can be seen that a respective semiconductor switch 7 having back-to-back connected diodes is connected between the connection of the conductor section 13 and each of the annular conductors 4, 5 of the DC bus. In addition, at least one support capacitor 9 is connected between the potentials of the annular conductors, 4, 5.

Figure 14:
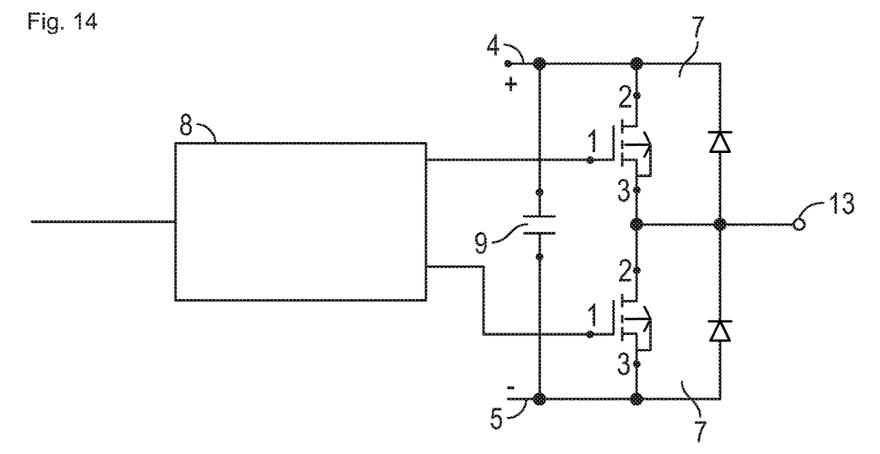
FIG. 14 shows an embodiment of a half-bridge with a driver.

FIG. 14 additionally shows the driver circuit 8, which controls each of the semiconductor switches 7 on the gate side. Otherwise, the circuit according to FIG. 14 corresponds to that of FIG. 13.

Figure 15:
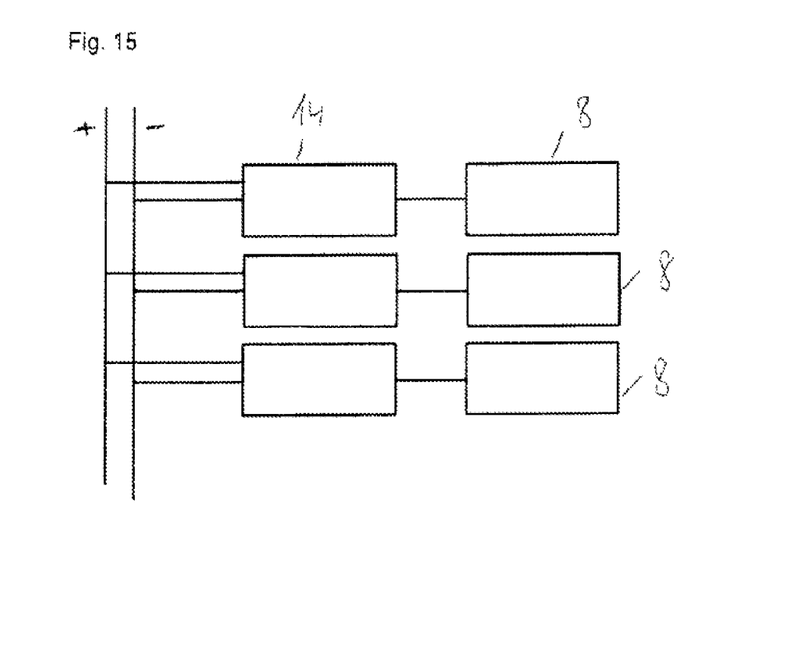
FIG. 15 shows an embodiment of the power supply for the drivers.
Figure 16:
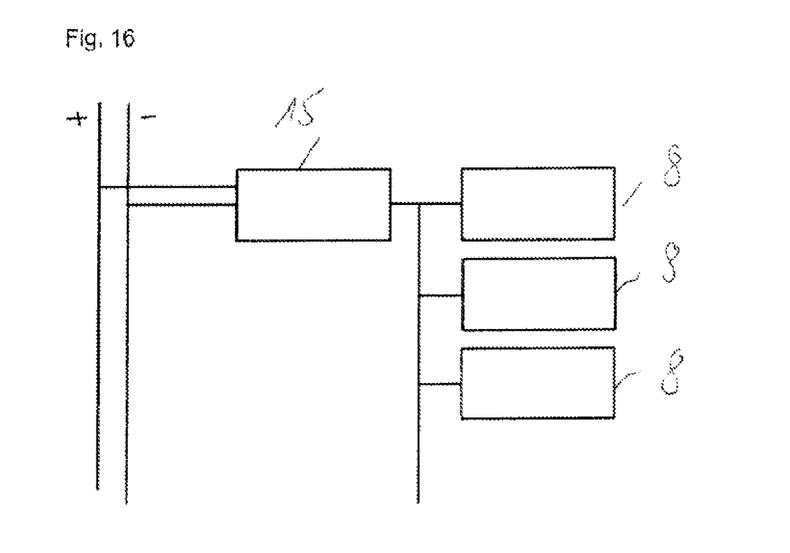
FIG. 16 shows an embodiment of the power supply for the drivers.
Figure 25:
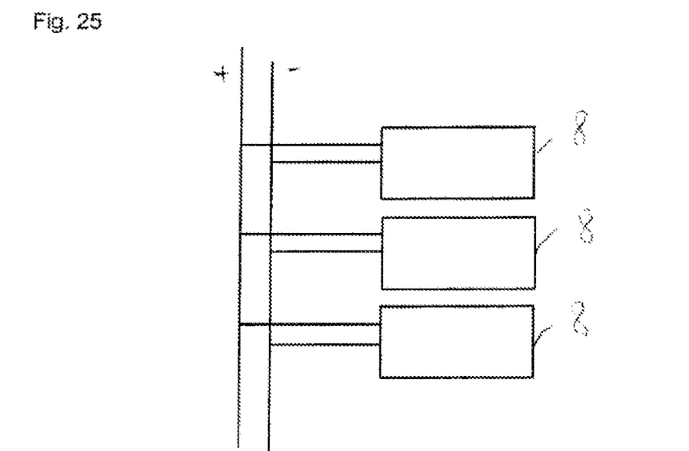
FIG. 25 shows yet another embodiment of the power supply for the drivers.

FIGS. 15 and 16, as well as FIG. 25, show possible voltage supplies for the drivers 8. A separate driver 8 is provided for each half-bridge of each electronic component. The drivers 8 can either have a respective voltage regulator 14, as shown in FIG. 15, or at least two drivers can have a common voltage regulator 15, as shown in FIG. 16, or the drivers 8 can be directly connected to the DC bus as shown in FIG. 25.

The voltage regulators 14, 15 are used for generating the high-side signals.

Figure 17:
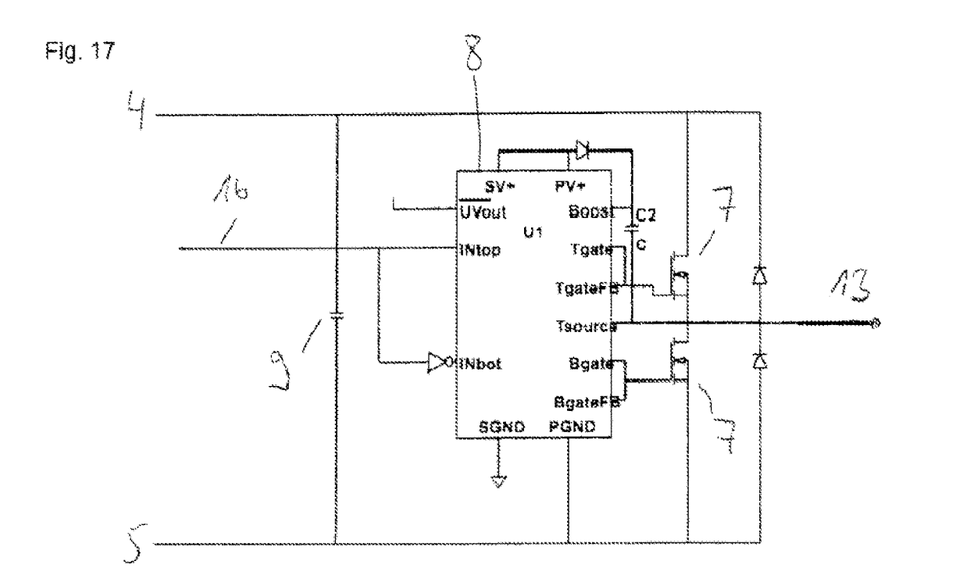
FIG. 17 shows an embodiment of the driver.

FIG. 17 shows the construction and wiring of the driver 8 in greater detail. The driver generates its own switching signals and communicates actual and target current values to a main controller via a switching signal interface 16. The driver receives its switching signals from a main controller via a switching signal interface 16.

Figure 18:
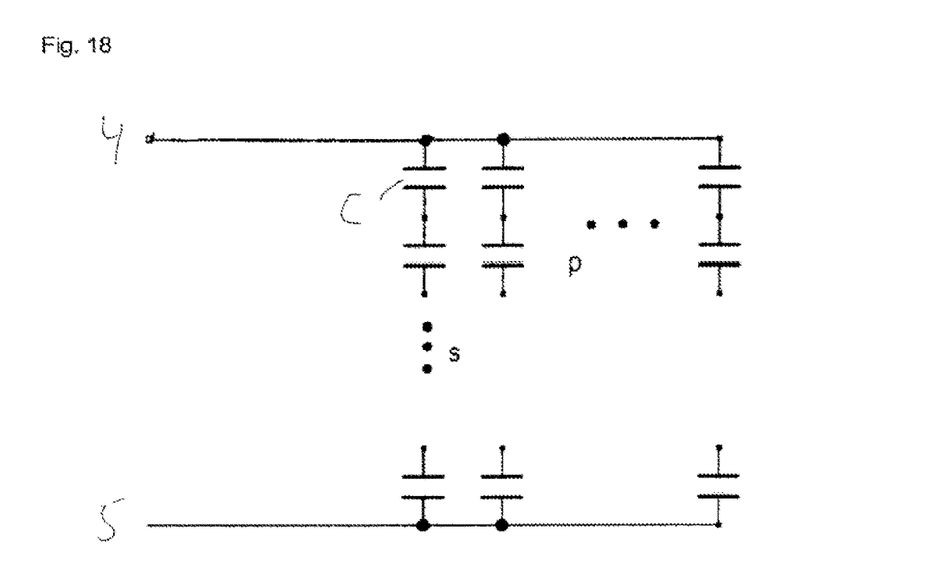
FIG. 18 shows an embodiment of a capacitor bank.

FIG. 18 shows the structure of the support capacitor that is connected between the inner and outer annular conductors, 4, 5. It can be recognized that s individual capacitors C are connected in series and the series connections are connected in parallel in p parallel branches.

Figure 19:
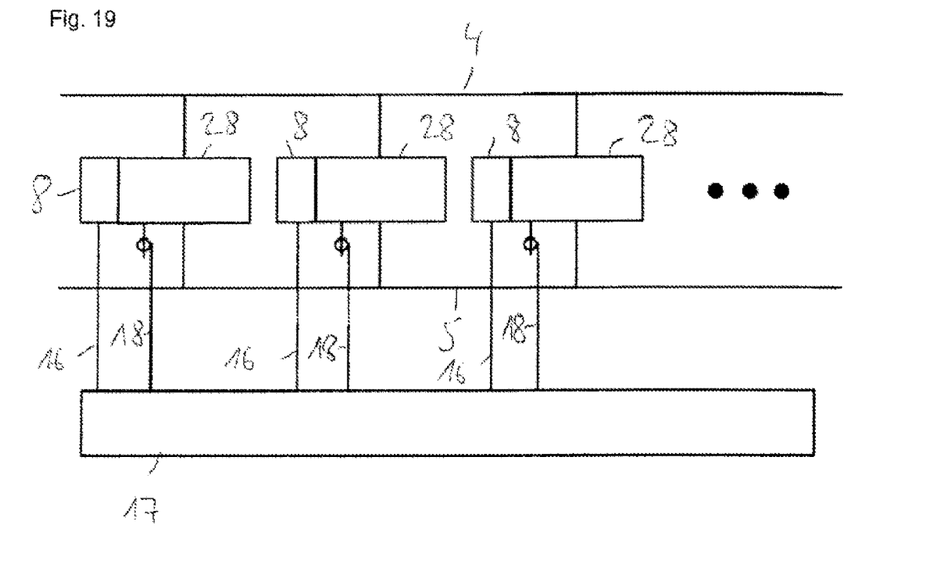
FIG. 19 shows an embodiment of the controlling of power-electronics components by using concentrated logic.
Figure 20:
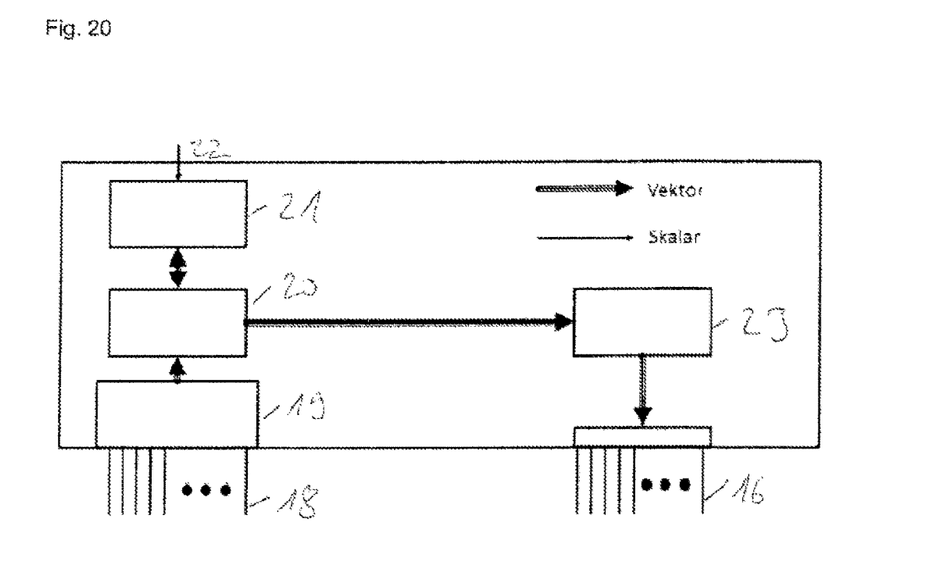
FIG. 20 shows an embodiment of the controller with concentrated logic for the implementation of FIG. 19.

FIGS. 19 and 20 show the controlling of the drivers 8 with concentrated logic. A central control unit 17 is provided, which issues switching signals via the switching signal lines 16 to respective drivers 8 and receives actual value current signals fed back via sensor lines 18 from the half-bridge circuits 28 associated with the respective drivers 8.

FIG. 20 makes this concrete by showing at the lower left in the drawing a current actual-value detection unit 19, which receives signals from each half-bridge 28 by means of the sensor lines 18 and reports them to a central current regulator 20. The current regulator 20 communicates with higher-level control circuits 21, which receive specifications 22 from the outside via an interface.

The current regulator 20 vectorially controls a switching signal generation unit 23, which in this embodiment, generates switching signals in the form of pulse-width modulated signals and outputs them to the drivers of the half-bridges 28 via the switching signal lines 16.

Figure 21:
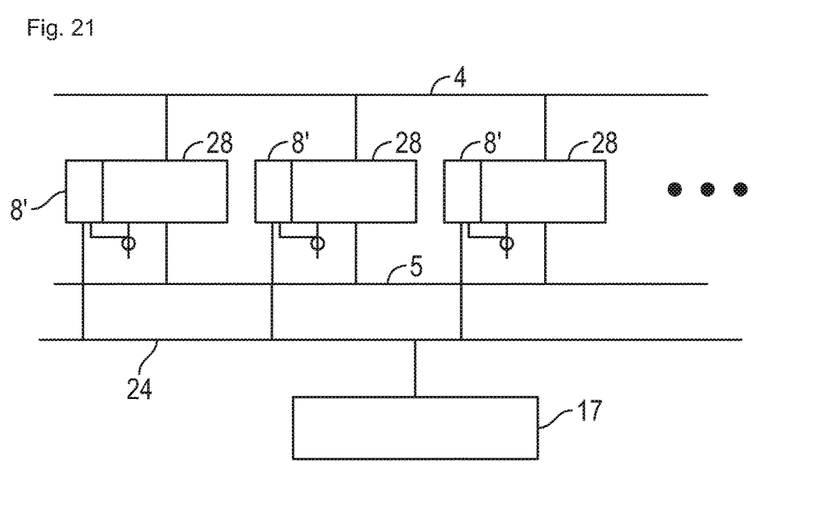
FIG. 21 shows an embodiment of the controlling of the power-electronic elements by using distributed logic.
Figure 22:
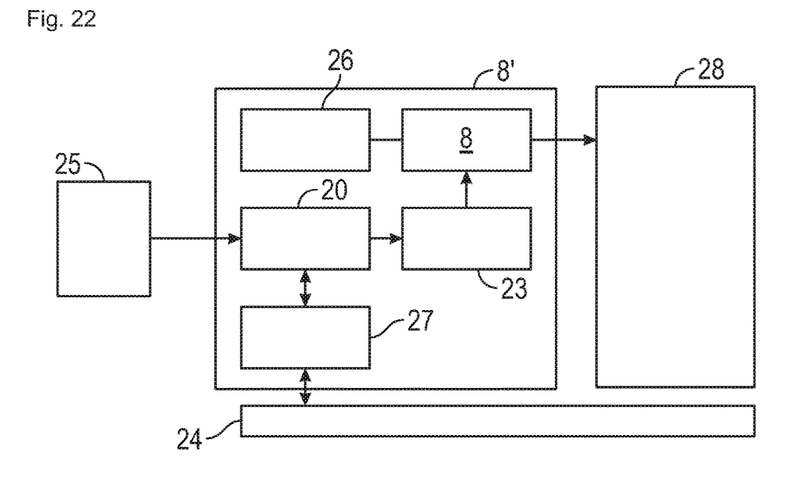
FIG. 22 shows an embodiment of a controller module for the design from FIG. 21.
Figure 23:
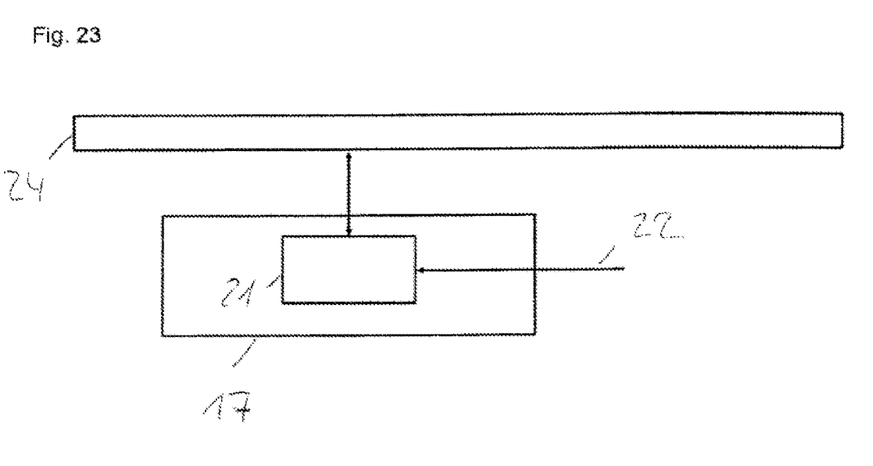
FIG. 23 shows an embodiment of a central unit for the controller according to FIG. 21.

As an alternative, FIGS. 21-23 show the controlling of the drivers with a distributed logic in place of the central logic as in FIGS. 19 and 20.

Differing from FIG. 19, a controller is associated with each driver 8' in FIG. 21. This controller detects the current signals from the respective associated half-bridge 28 locally. Thus, each driver 8' can generate its own switching signals. Each driver additionally communicates with a central control unit 17 via a data bus 24.

FIG. 22 shows the structure of the drivers 8' that have been extended with this local controller. Depending on an actual current detection 25 at the half-bridge 28 and on actual and target values of the data bus 24, the current regulator 20 generates target values for the PWM generation 23, which in turn control the drivers 8. The driver 8 has a DC voltage supply 26. The current regulator 20 communicates with the data bus 24 via a bus controller 27. The driver 8 controls a respective half-bridge 28.

It can be seen in FIG. 23 that the data bus 24 receives specified control parameters specified by higher-level control circuits 21 of a central control unit 17 and reports measurement values back. The higher-level control circuits 21 can receive target value specifications 22 from outside.

Figure 24:
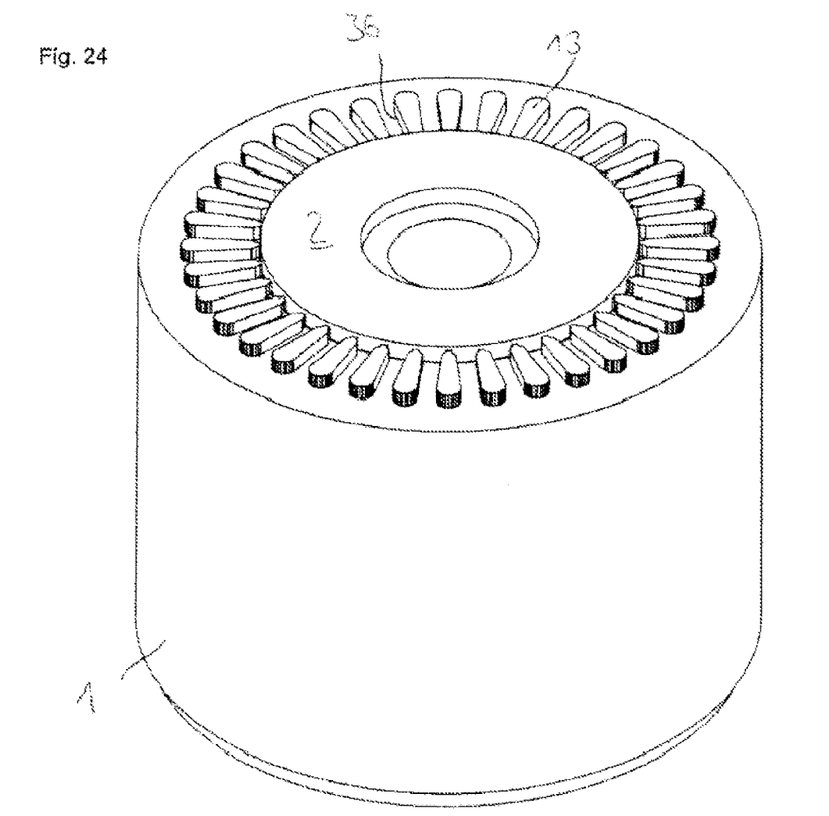
FIG. 24 shows the embodiment of FIG. 1 on the basis of a simplified representation.

FIG. 24 shows the embodiment of FIG. 1, but on the basis of a simplified representation. To the extent that the two representations coincide, the description will not be repeated. Unlike FIG. 1, the annular conductors 4, 5 and the power-electronics components 3 have been removed graphically in FIG. 24, so that the conductor sections 13 in the slots 36 of this embodiment according to FIG. 1 become visible.

FIG. 25 has already been described with reference to FIGS. 15 and 16, and therefore does not require repetition at this point.

The invention claimed is:

1. An electrical machine having a stator, wherein:
   the stator comprises a plurality of slots for receiving a stator winding,
   one respective conductor section of the stator winding is inserted into each slot,
   the conductor sections of at least one pair of poles are short-circuited to one another on a first side of the stator,
   the conductor sections on a second side of the stator, opposite from the first side, are each connected to a terminal of a power supply unit,
   the power supply unit comprises two annular conductors between which at least one power-electronics component is arranged, and
   the number of flat subsurfaces of the inner annular conductor and of the outer annular conductor are each equal to the number of slots of the stator.

2. The electrical machine according to claim 1, wherein the power-electronics component comprises at least one semiconductor switch, a driver circuit and at least one capacitor.

3. The electrical machine according to claim 2, wherein a respective semiconductor switch is connected electrically and mechanically to each of the annular conductors and the power-electronics component is connected electrically and mechanically to a respective conductor section.

4. The electrical machine according to claim 3, wherein the radially outer surface of the inner annular conductor and the radially inner surface of the outer annular conductor each consists of at least three flat subsurfaces.

5. The electrical machine according to claim 4, wherein the numbers of flat subsurfaces of the inner annular conductor and of the outer annular conductor are identical.

6. The electrical machine according to claim 3, wherein the semiconductor switches are each connected over a large area in the radial direction to the respective annular conductor.

7. The electrical machine according to claim 3, wherein the power-electronics component is arranged largely inside the annular conductors, as viewed in a radial projection.

8. The electrical machine according to claim 3, wherein the two annular conductors supply a positive and a negative DC voltage, respectively, of the at least one power-electronics component.

9. The electrical machine according to claim 3, wherein an annular cooling channel, which is arranged in at least one of the two annular conductors or therebetween, is provided in order to conduct a fluid.

10. The electrical machine according to claim 3, wherein the conductor sections are each supplied with a phase of their own by the power supply unit.

11. The electrical machine according to claim 10, wherein the number of phases is 3.

12. The electrical machine according to claim 10, wherein the number of phases is 4.

13. The electrical machine according to claim 10, wherein the number of phases is 5.

14. The electrical machine according to claim 10, wherein the number of phases is 10.

15. The electrical machine according to claim 1, wherein the conductor segments respectively inserted into the slots are straight.

16. The electrical machine according to claim 1, wherein the conductor sections respectively inserted into the slots are aluminum rods, copper rods, bronze rods or alloys thereof.

* * * * *